United States Patent [19]

Sasaki et al.

[11] 4,396,445
[45] Aug. 2, 1983

[54] METHOD OF MAKING A CERAMIC TURBINE ROTOR UNIT

[75] Inventors: Naoto Sasaki, Zushi; Kenji Nakayama, Tokyo; Tadayoshi Hirao, Nagoya, all of Japan

[73] Assignee: Nissan Motor Co., Ltd., Yokohama, Japan

[21] Appl. No.: 155,012

[22] Filed: May 30, 1980

[30] Foreign Application Priority Data

Jun. 1, 1979 [JP] Japan .................................. 54-68315

[51] Int. Cl.³ ........................ C04B 33/28; C04B 39/00
[52] U.S. Cl. .................................... 156/89; 156/293; 156/294; 416/241 B
[58] Field of Search ................ 156/89, 293, 294, 242; 264/56, 57, 60, 63; 416/241 B

[56] References Cited

U.S. PATENT DOCUMENTS

| | | | |
|---|---|---|---|
| 2,142,422 | 1/1939 | Taylor | 264/60 |
| 2,534,653 | 12/1950 | Austin et al. | 264/60 |
| 3,564,328 | 2/1971 | Bagley et al. | 156/89 |
| 3,887,411 | 6/1975 | Goodyear et al. | 416/241 B |
| 3,966,885 | 6/1976 | May | 416/241 B |
| 3,973,875 | 8/1976 | Bird | 416/241 B |
| 4,011,295 | 3/1977 | Tree et al. | 416/241 B |
| 4,175,911 | 11/1979 | Tiefenbacher | 416/241 B |
| 4,248,813 | 2/1981 | Hattori et al. | 264/60 |
| 4,311,433 | 1/1982 | Bratton et al. | 416/241 B |

Primary Examiner—Caleb Weston
Attorney, Agent, or Firm—Lane, Aitken & Kananen

[57] ABSTRACT

The turbine rotor unit comprises a ceramic rotor and a ceramic shaft. Connection or bonding of the rotor and the shaft is made by applying a slip of ceramic material to engaging sections of the rotor and the shaft and baking them for solidification of the slip. If metal-silicone is used as a material for the rotor and the shaft, the connection or bonding of them can be made without the slip.

3 Claims, 4 Drawing Figures

METHOD OF MAKING A CERAMIC TURBINE ROTOR UNIT

FIELD OF THE INVENTION

The present invention relates to a ceramic turbine rotor unit and a method of producing the same, which rotor unit is commonly used in gas turbine engines and/or turbocharges. It should be noted that, in the following, the term "turbine rotor unit" refers to a combined article which comprises at least a rotor proper and a shaft proper coaxially connected to the rotor proper to be rotatable therewith.

BACKGROUND OF THE INVENTION

In a field of gas turbine engines and/or turbocharges, it is a common practice to use a ceramic turbine rotor for its high heat resistance. Some of the ceramic turbine rotors conventionally used, however, still have drawbacks because of their inherent constructions, as will be apparent as the description proceeds.

SUMMARY OF THE INVENTION

According to the first aspect of the present invention, there is provided a turbine rotor unit. The turbine rotor unit comprises a rotor proper of ceramic, the rotor proper being formed with a central bore which is bounded by a wall of the rotor proper, a shaft proper of ceramic, the shaft proper having an end coaxially disposed in the central bore with a surface of the end contacting with the wall, and means for permitting the surface of the end to bound to the wall when heated.

According to the second aspect of the present invention, there is provided a method of producing a turbine rotor unit of ceramic. The method comprises in steps preparing first and second articles of ceramic material in green condition which are respectively formed into a rotor proper and a shaft proper, the first article having therethrough a bore of which the size matches substantially with that of an end of the second article, disposing the end of the second article into the bore of the first article in such a manner that a surface of the end of the second article is brought into contact with a wall which bounds the bore of the first article, and heating the combined first and second articles to allow the same to be sintered so that upon completion of this step, the first and second articles thus sintered are securely bonded to each other.

OBJECTS OF THE INVENTION

It is an object of the present invention to provide an improved ceramic turbine rotor unit which is characterized by its high durability particularly against heat.

It is another object of the present invention to provide an improved turbine rotor unit which is simple in construction.

It is still another object of the present invention to provide a method of producing the improved ceramic turbine rotor unit.

Other objects and advantages of the present invention will become clear from the following description when taken in conjunction with the accompanying drawings.

DESCRIPTION OF PRIOR ART

Prior to describing in detail embodiments of the invention, one of the conventionally used turbine rotor units will be explained with reference to FIG. 1 in order to clarify the invention.

Figure 1:
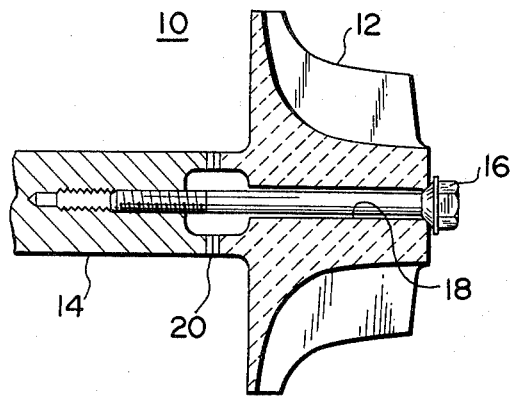
FIG. 1 is a partial and sectional view of a turbine rotor unit which is conventionally used.

Referring to FIG. 1, the conventional turbine rotor unit is shown as being generally designated by numeral 10. The rotor unit 10 generally comprises a ceramic turbine rotor proper 12 and a metallic shaft 14. As shown, the rotor proper 12 is coaxially connected to the shaft 14 by a connecting bolt 16 which passes through a central bore 18 of the rotor proper 12 and is screwed at its threaded leading end into the shaft 14. Indicated by numeral 20 is a section where rigid coupling is arranged for providing rigid connection between the rotor proper 12 and the shaft 14. The rigid coupling 20 hereinshown is provided by radially outwardly grooving the respective contacting surfaces of the rotor proper 12 and the shaft 14, and forcing them thus grooved to mesh with each other.

In the conventional turbine rotor unit 10 mentioned hereinabove, the following drawbacks or problems are encountered because of its inherent construction. First, lowering in mechanical strength of the metallic shaft 14 and loosening of the connecting bolt 16 under usage, which originate from the different natures in material between the rotor proper 12 and the shaft 14, tend to damage the contacting surface of the rotor proper 12 made of ceramic. Second, grooving the contacting surfaces of the rotor proper 12 and the shaft 14 for the rigid coupling necessitates high machining technique thereby increasing production cost of the rotor unit. Third, miniaturization of the rotor unit 10 is very difficult due to its inherent construction using the bolt 16.

For solving the above problems, an idea has been thought out in which the rotor proper and the shaft are constructed of ceramic as a one piece article. However, in this case, conventional economical molding methods, such as an injection molding method, a slip casting method or a hydrostatic pressure molding method, can not be used because these molding methods are unsuitable for forming an article having a complicated configuration. In fact, the one piece rotor unit thus produced has an extreme difference in thickness throughout the entire construction thereof, particularly between the blade sections of the rotor proper, the hub section of the same and the shaft section. Further, the rotor unit thus molded with a relatively large sized one piece construction has a tendency to be cracked and to make blowholes and too low density portions therein when sintered. Furthermore, at the additive removing process wherein shaping agents, such as thermoplastic resins and starches, used for shaping the green article of the rotor unit are removed, the article tends to be cracked, particularly at the thicker portion thereof, by a pressurized gas produced in the article.

Therefore, it is an essential object of the present invention to provide an improved ceramic turbine rotor unit and a method of producing the same which unit is free of the above-mentioned drawbacks encountered in the conventional unit.

DESCRIPTION OF THE EMBODIMENTS

Figure 2:
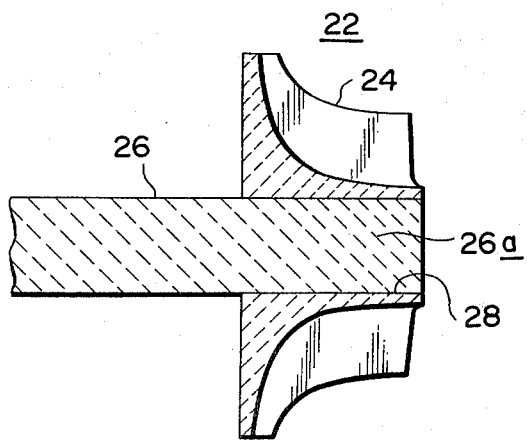
FIG. 2 is a view similar to FIG. 1, but shows a first preferred embodiment of the present invention.

Referring to FIG. 2 of the drawings, there is illustrated a first embodiment of the invention. The turbine rotor unit 22 of the embodiment comprises a rotor proper 24 and a shaft proper 26 both of which are constructed from a common ceramic material. It should be noted that the rotor proper 24 and the shaft proper 26 are moulded separately, but thereafter they are united by a method which will be described hereinafter. The green article of the rotor proper 24 may be made by using a conventional moulding method, such as an injection moulding method or a slip casting method, while the green article of the shaft proper 26 may be made by using, for example, a slip casting method or a hydrostatic pressure moulding method. As shown in the drawing, the rotor proper 24 has a central bore 28 in which an end 26a of the shaft 26 is tightly disposed for rotation therewith. It should be noted that the bore 28 is formed or left at the time when the green article of the rotor proper 24 is moulded.

Fixing of the rotor proper 24 to the shaft proper 26 is made as follows. A slip having the same contents as the green ceramic material of the rotor proper 24 and the shaft 26 is applied to at least one of the bore-bounding wall 28 of the rotor proper 24 and the end of the shaft proper 26 while these articles 24 and 26 are still in green condition. Then, the end of the shaft proper 26 is snugly disposed into the bore 28 of the rotor proper 24, and then these temporarily combined green articles 24 and 26 are baked or sintered in a conventional manner. With this procedure, a ceramic turbine rotor unit is produced with secure fixing or bonding between the rotor proper 24 and the shaft proper 26. In addition to the above, another method for connecting the separated two articles 24 and 26 may be employed wherein the slip is applied to the articles 24 and 26 which have been sintered, and then the articles 24 and 26 which are temporarily combined are baked again for solidification of the slip. In this method, the sintering of the articles prior to the final baking may be made completely or incompletely.

Now, it should be noted that instead of using ceramic material for the unit 22, it is also possible to use metal-silicone material as a material of the unit. In this case, the bonding of the rotor proper to the shaft proper can be achieved without using the slip. In fact, baking or sintering the temporarily combined green articles of the metal-silicone material has them bonded. Of course, usage of the slip assures stronger bonding between the articles 24 and 26.

Figure 3:
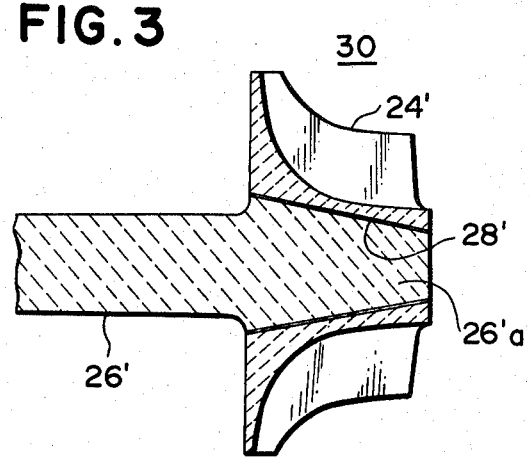
FIG. 3 is a view also similar to FIG. 1, but shows a second preferred embodiment of the invention.

Referring to FIG. 3, there is illustrated a second embodiment of the invention. In the turbine rotor unit 30 of this embodiment, the central bore 28' formed in the ceramic rotor proper 24' is bounded by a frusto-conical surface, and for matching with the frusto-conical surface the end of the ceramic shaft proper 26' is formed into an arrow head 26'a as shown. Bonding of the rotor proper 24' to the shaft proper 26' is made in substantially the same manner as in the case of the first embodiment described hereinbefore. Now, it should be noted that according to the second embodiment, contacting surface areas between the rotor proper 24' and the shaft proper 26' are considerably greater than those in the first embodiment thereby achieving a much more secured connection therebetween. Further, in the second embodiment, the hub section of the rotor proper 24' is constructed smaller in thickness than that of the first embodiment. Thus, the durability against thermal shocks is much more improved.

With the above-stated first and second embodiments of the invention, it will be appreciated that since the green articles of the rotor proper and the shaft are moulded separately, the shaping of each green article can be made elaborately. Further, since each of the rotor proper 24 or 24' and the shaft 26 or 26' is constructed uniformly in thickness as compared with the before-mentioned conventional one piece rotor unit of ceramic, the undesired cracks and blowholes will not appear when they are sintered. Furthermore, the bonding of the rotor proper 24 or 24' to the shaft proper 26 or 26' is easily made in comparison with the case of the prior art unit 10 of FIG. 1, and thus the productivity of the turbine rotor unit is improved.

Figure 4:
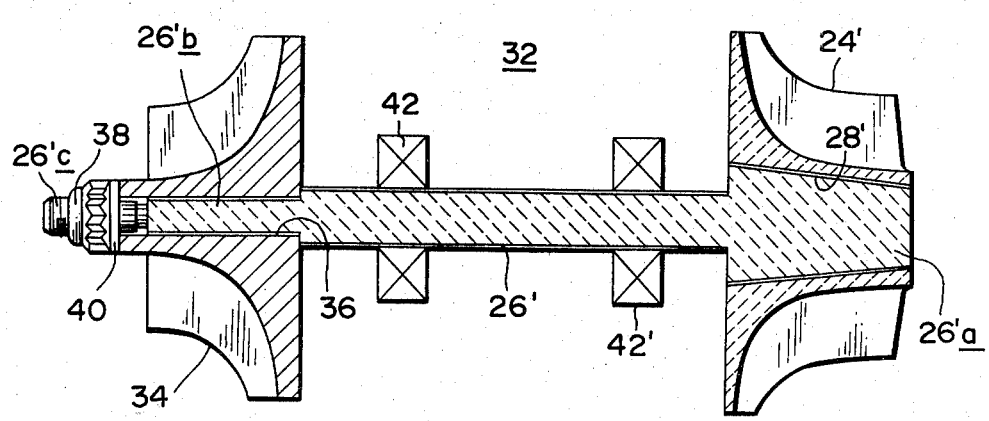
FIG. 4 is a sectional view, showing the turbine rotor unit of the second embodiment as being equipped with a metallic impeller.

Referring to FIG. 4, there is shown an example 32 in which the turbine rotor unit 24' of FIG. 3 is combined with a metallic impeller 34. Designated by numerals 42 and 42' are bearings for rotatably supporting the shaft 26'. As shown, the shaft 26' is formed at its left end with first and second reduced diameter sections 26'b and 26'c. The second section 26'c is threaded after completion of sintering of the rotor unit 30, by using for example a diamond cutting device. For easy threading operation, a rough configuration of the thread may be formed on the second section 26'c at the time when the shaft 26' is still in green condition.

The metallic impeller 34 is formed with a central bore 36 into which the first reduced diameter section 26'b of the shaft 26' is snugly disposed. A nut 38 is screwed onto the second threaded reduced diameter section 26'c to sustain the metallic impeller 34 on the shaft 26', with a washer 40 interposed between the nut 38 and the impeller 34. If desired, a heat resisting adhesive material may be applied to the first reduced diameter section 26'b for assured bonding between the impeller 34 and the shaft 26'.

Although, the above description is directed to a radial flow turbine unit, the invention is applicable to the other type turbine unit such as an axial flow turbine unit.

What is claimed is:

1. A method of producing a turbine rotor unit of ceramic comprising the procedural combination of steps of:
   (a) separately preparing first and second articles from a ceramic material in green condition which are respectively formed into a rotor proper and a shaft proper, said first article having therethrough a bore defined by a bore-bounding wall and having a size which matches substantially with a surface of an end of said second article;
   (b) heating said first and second articles to allow them to be incompletely sintered;
   (c) applying a slip of the same ceramic material as the first and second articles to at least one of the bore-bounding wall of said first article and the surface of said end of said second article;
   (d) disposing said end of said second article into said bore of said first article in such a manner that the surface of said end of said second article contacts with the bore-bounding wall of said first article; and
   (e) firing the temporarily connected first and second articles to allow the same to be sintered so that upon completion of this step, said first and second articles thus sintered are securely bonded with each other.

2. A method as claimed in claim 1, in which said bore is bounded by a frusto-conical surface formed on said first article, and in which said end of said shaft proper is formed into an arrow-head construction to match with the form of the frusto-conical bore of said first article.

3. A method as claimed in claim 1, wherein step (a) further includes the steps of preparing said rotor proper by separately moulding a green article by either injection moulding or slip casting and preparing said shaft proper by separately moulding a green article by slip casting or hydrostatic pressure moulding, said bore being formed in said rotor proper during moulding.

* * * * *